United States Patent
Deng

(10) Patent No.: US 12,526,699 B2
(45) Date of Patent: Jan. 13, 2026

(54) CELL CONDITIONAL CHANGE METHOD, USER EQUIPMENT AND COMPUTER-READABLE STORAGE MEDIUM

(71) Applicant: SPREADTRUM COMMUNICATIONS (SHANGHAI) CO., LTD., Shanghai (CN)

(72) Inventor: Yun Deng, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 961 days.

(21) Appl. No.: 17/764,347

(22) PCT Filed: Jul. 27, 2020

(86) PCT No.: PCT/CN2020/104747
§ 371 (c)(1),
(2) Date: Mar. 28, 2022

(87) PCT Pub. No.: WO2021/057235
PCT Pub. Date: Apr. 1, 2021

(65) Prior Publication Data
US 2022/0369173 A1    Nov. 17, 2022

(30) Foreign Application Priority Data

Sep. 29, 2019   (CN) .......................... 201910935070.9

(51) Int. Cl.
*H04W 36/00*   (2009.01)
*H04W 36/36*   (2009.01)
*H04W 76/27*   (2018.01)

(52) U.S. Cl.
CPC . *H04W 36/0027* (2013.01); *H04W 36/00692* (2023.05); *H04W 36/362* (2023.05); *H04W 76/27* (2018.02)

(58) Field of Classification Search
CPC  H04W 36/0027; H04W 76/27; H04W 36/362
See application file for complete search history.

(56) References Cited

U.S. PATENT DOCUMENTS

2015/0271713 A1   9/2015  Kim et al.
2015/0373686 A1  12/2015  Dinan
(Continued)

FOREIGN PATENT DOCUMENTS

CN    102083154 A    6/2011
CN    104812008 A    7/2015
(Continued)

OTHER PUBLICATIONS

Huawei, "pSCell related functionalities and procedures"; 3GPP TSG-RAN WG2 Meeting #86; R2-142027 May 19-23, 2014; 4 pages.
(Continued)

*Primary Examiner* — Siming Liu
(74) *Attorney, Agent, or Firm* — CANTOR COLBURN LLP

(57) ABSTRACT

A cell conditional change method, a user equipment and a computer-readable storage medium are provided. The method includes: based on determining that a candidate PSCell meets a PSCell change trigger condition, transmitting an RRC signaling to an MN, wherein a candidate PSCell or a target PSCell that meets the PSCell change trigger condition is indicated in the RRC signaling.

10 Claims, 2 Drawing Sheets

(56) References Cited

U.S. PATENT DOCUMENTS

| | | | |
|---|---|---|---|
| 2016/0373975 A1 | 12/2016 | Xu et al. | |
| 2017/0055187 A1 | 2/2017 | Kang et al. | |
| 2018/0049184 A1 | 2/2018 | Lee et al. | |
| 2018/0124612 A1 | 5/2018 | Babaei et al. | |
| 2018/0213450 A1 | 7/2018 | Futaki et al. | |
| 2020/0163144 A1* | 5/2020 | Ryoo | H04L 47/82 |
| 2021/0099926 A1* | 4/2021 | Chen | H04W 36/362 |
| 2021/0400760 A1* | 12/2021 | Yang | H04W 76/19 |

FOREIGN PATENT DOCUMENTS

| | | |
|---|---|---|
| CN | 106068658 A | 11/2016 |
| CN | 107690163 A | 2/2018 |
| CN | 107925931 A | 4/2018 |
| CN | 108012287 A | 5/2018 |
| EP | 3905833 A1 | 11/2021 |
| IN | 110545567 A | 12/2019 |
| JP | 2022548191 A | 11/2022 |
| WO | 2018231136 A1 | 12/2018 |
| WO | 2021051357 A1 | 3/2021 |

OTHER PUBLICATIONS

International Search Report for International Application No. PCT/CN2020/104747; Mailing Date, Oct. 21, 2020.

EPO Extended European Search Report for corresponding EP Application No. 20869113.9, Mailing Date, Mar. 7, 2023.

JPO Notice of Reasons for Refusal for corresponding JP Application No. 2022-519487; Mailing Date, May 24, 2023.

MediaTek Inc., "Conditional PSCell addition", 3GPP TSG-RAN WG2 #106, R2-1906082, May 13-17, 2019, 3 pages.

NEC, "Reuse of conditional handover for SCG change in NR-DC", 3GPP TSG-RAN WG2 #107, R2-1909144 (resubmission of R2-1906754), Aug. 26-30, 2019, 3 pages.

OPPO, "Summary of [106#42] [NR/LTE/mob enh] CHO configuration", 3GPP TSG-RAN WG2 Meeting #107, R2-1911733, Aug. 26-30, 2019, 26 pages.

ZTE Corporation et al., "Discussion on the RRC handling during CHO execution", 3GPP TSG RAN WG2 Meeting #106, R2-1907109, May 13-17, 2019, 3 pages.

ZTE Corporation et al., "MCG failure report procedure in MR-DC", 3GPP TSG-RAN WG2 Meeting #105, R2-1900805, Feb. 25-Mar. 1, 2019, 5 pages.

EPO Partial Supplementary European Search Report for corresponding EP Application No. 20869113.9; Issued on Oct. 19, 2022.

Spreadtrum Communications, "PSCell conditional change considerations", 3GPP TSG-RAN WG2 Meeting #107bis, R2-1912242, Oct. 14-18, 2019, 3 pages.

ZTE, "Clarification on SN modification procedure", 3GPP TSG-RAN WG2 Meeting #101, R2-1802395, Feb. 26-Mar. 2, 2018, 7 pages.

* cited by examiner ance CELL CONDITIONAL CHANGE METHOD, USER EQUIPMENT AND COMPUTER-READABLE STORAGE MEDIUM

CROSS-REFERENCE TO RELATED APPLICATIONS

This is the U.S. national stage of application No. PCT/CN2020/104747, filed on Jul. 27, 2020. Priority under 35 U.S.C. § 119(a) and 35 U.S.C. § 365(b) is claimed from Chinese Patent Application No. 201910935070.9, filed on Sep. 29, 2019, and entitled "CELL CONDITIONAL CHANGE METHOD, USER EQUIPMENT AND COMPUTER-READABLE STORAGE MEDIUM", the entire disclosure of which is also incorporated herein by reference.

TECHNICAL FIELD

The present disclosure generally relates to radio communication field, and more particularly, to a cell conditional change method, a User Equipment (UE) and a computer-readable storage medium.

BACKGROUND

In discussion of 3GPP, a Conditional Handover (CHO) has been introduced. Compared with an existing handover process, a handover command for CHO includes a handover condition (or referred to as a handover trigger condition), such as determining whether signal quality of candidate target cells is higher than that of a serving cell by a predetermined offset. After receiving the handover command, a UE determines whether the handover condition is met. If the handover condition is met, the UE uses configuration parameters of the candidate target cells contained in the handover command to access a target cell, synchronizes with the target cell, and initiates a random access procedure in the target cell. If the handover condition is not met, the UE continues to maintain Radio Resource Control (RRC) connection with a source base station.

CHO can be used for Primary Secondary Cell change (PSCell change) and Primary Secondary Cell Addition (PSCell Addition) in dual connectivity. In dual connectivity, a UE keeps connected with two base stations including a Master Node (MN) and a Secondary Mode (SN) (the UE is at least configured with PCell by the MN, and is at least configured with PSCell by the SN), and is capable of simultaneously receiving signaling and data from the two base stations, and simultaneously transmitting signaling and data to the two base stations.

When CHO is introduced into PSCell change, the MN may determine one or several candidate PSCells, and a change trigger condition corresponding to each candidate PSCell. It should be noted that, strictly speaking, a PSCell change cannot be regarded as "handover". For a UE in a dual-connectivity state, the MN is responsible for the UE's RRC connection establishment and link management such as handover decision, and the SN is responsible for data transmission. When the SN changes or PSCell varies, it can only be called an SN change or a PSCell change. When PCell varies, it can be called a handover. In this embodiment, PCell change and PSCell change are represented by cell change. For PSCell Change, it may occur within a same SN or between different SNs, and the PSCell change between different SNs may also be referred to as an SN change.

The MN transmits a PSCell conditional change request to the SN to which candidate PSCells belong. The PSCell conditional change request includes radio parameters configured by the MN for the UE, for example, ConfigRestrictInfoSCG, as well as UE capability information and radio parameters (sourceConfigSCG) configured by a source SN for the UE.

After receiving the PSCell conditional change request, the candidate SN makes an admission control decision based on information such as cell load, to accept or reject the request. If the request is accepted, the candidate SN configures radio parameters of candidate Secondary Cell Groups (SCG configuration) for the UE, and return acknowledgement information to the MN, where the acknowledgement information carries the SCG configuration configured for the UE. After receiving the acknowledgement message, the MN transmits the SCG configuration, identifiers of the candidate PSCells and a PSCell change trigger condition to the UE via RRC signaling. After receiving the RRC signaling, the UE saves received information and starts to evaluate the candidate PSCells. When the candidate PSCell meets the PSCell change trigger condition, the PSCell change is started.

In some solutions, when the UE is in a process of PSCell conditional change, and has started to perform PSCell change, the UE still maintains connection with the MN, and can receive RRC signaling from the MN.

SUMMARY

Embodiments of the present disclosure provide solutions for processing a PSCell change that is being executed in response to an RRC signaling being received from an MN, so that a UE can correctly handle the PSCell change and link management at the MN, which may avoid a scenario in which the UE cannot be controlled, and improve stability of a radio link.

In an embodiment of the present disclosure, a cell conditional change method is provided, including: based on a candidate PSCell meeting a PSCell change trigger condition, performing a PSCell change, wherein the candidate PSCell corresponds to a candidate SN; during the PSCell change, determining whether a preset condition for terminating the PSCell change is met, wherein the preset condition comprises any of the following: an RRC signaling received from an MN being an RRC signaling of a preset type, wherein the RRC signaling of the preset type comprises an RRC signaling for Primary Cell (PCell) change, an RRC signaling for PSCell change, or a release signaling for PSCell; or an abnormal connection with the MN being detected, wherein the abnormal connection with the MN comprises at least one of following scenarios: detection of a radio link failure of a PCell, failure of integrity protection, receiving an RRC signaling from the MN but failing to comply with configuration parameters therein, or trigger of RRC connection reestablishment; and based on the preset condition for terminating the PSCell change being met, terminating the PSCell change.

In an embodiment of the present disclosure, a cell conditional change method applied in a UE is provided, including: based on determining that a candidate PSCell meets a PSCell change trigger condition, transmitting an RRC signaling to an MN, wherein a candidate PSCell or a target PSCell that meets the PSCell change trigger condition is indicated in the RRC signaling.

In an embodiment of the present disclosure, a cell conditional change method is provided, where the method is applied in a UE which is configured with both PCell conditional change and PSCell conditional change, and includes: based on both a PCell change trigger condition and a PSCell change trigger condition being met, performing a PCell change.

In an embodiment of the present disclosure, a non-volatile or non-transitory computer-readable storage medium having computer instructions stored therein is provided, wherein when the computer instructions are executed by a processor, any one of the above methods is performed.

In an embodiment of the present disclosure, a UE including a memory and a processor is provided, wherein the memory has computer instructions stored therein, and when the processor executes the computer instructions, any one of the above methods is performed.

DETAILED DESCRIPTION

As described in the background, in some cell conditional change solutions, when a UE in a dual-connectivity state is in a process of PSCell conditional change, the UE still maintains connection with an MN, and can receive RRC signaling from the MN. However, the RRC signaling issued by the MN may conflict with the current PSCell change. Exiting standards haven't provided a solution for the above scenario.

In embodiments of the present disclosure, during a PSCell change, based on an RRC signaling received from an MN having a preset type, the PSCell change being executed is terminated, so that a UE may correctly handle the PSCell change and link management at the MN, which may avoid a scenario in which the UE cannot be controlled, and improve stability of a radio link.

In order to clarify the object, characteristic and advantages of embodiments of the present disclosure, embodiments of present disclosure will be described clearly in detail in conjunction with accompanying drawings.

Figure 1:
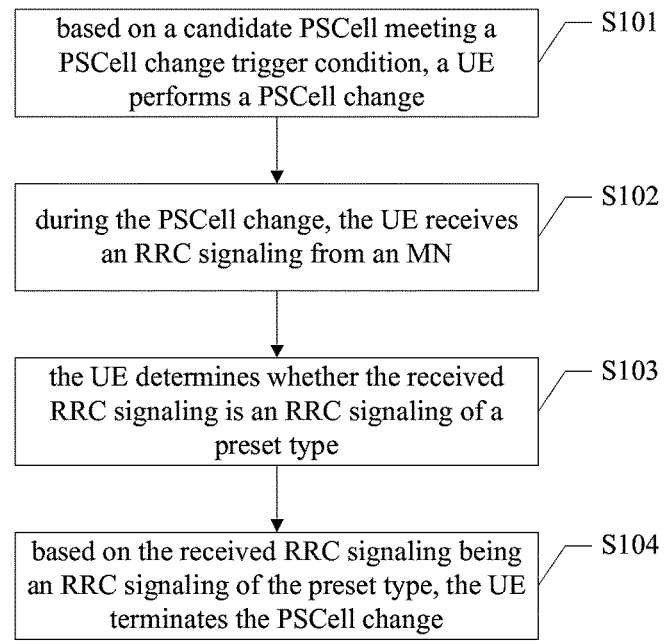
FIG. 1 is a flow chart of a cell conditional change method according to an embodiment.

Referring to FIG. 1, FIG. 1 is a flow chart of a cell conditional change method according to an embodiment.

In S101, based on a candidate PSCell meeting a PSCell change trigger condition, a UE performs a PSCell change.

By determining that a candidate PSCell meets a PSCell change trigger condition, the UE performs the PSCell change. Specific setting of the PSCell change trigger condition may adopt different mechanisms, such as an existing measurement event A3 or A5, which is not limited in the embodiments of the present disclosure.

In S101, based on determining that the candidate PSCell meets the PSCell change trigger condition, the UE may indicate a determined target PSCell to an MN, i.e., the target PSCell that the UE will access. The UE may indicate to the MN the target PSCell via an RRC signaling, for example, indicating an identity of the target PSCell.

In some embodiments, the candidate PSCell is under the jurisdiction of a candidate SN, the PCell is under the jurisdiction of an MN, and the source PSCell is under the jurisdiction of a source SN. Before the UE performs the PSCell change, the UE sets up dual connectivity with the MN and the SN.

In practice, there are different types of dual connectivity, such as LTE dual connectivity, dual connectivity of LTE and New Radio (NR), or NR dual connectivity. The dual connectivity of LTE and NR may include EN-DC (an LTE base station serves as UE's MN, and an NR base station serves as UE's SN), NE-DC (an NR base station serves as UE's MN, an LTE base station serves as UE's SN), and NGEN-DC (an LTE base station connected to a 5G core network serves as UE's MN, and an NR base station serves as UE's SN). A process for setting up a dual connectivity is well known in the art, and is not described in detail here. Reference may be made to the 3GPP TS37.340 standard.

In S102, during the PSCell change, the UE receives an RRC signaling from an MN.

In some embodiments, during a process of the UE performing the PSCell change, as the UE is still connected with the MN, the UE can continue to receive RRC signalings from the MN. If the RRC signaling from the MN is merely for modification of radio parameters at the MN side, the UE can continue to perform PSCell change. However, the RRC signaling from the MN received by the UE may be other types of signaling.

Therefore, following receiving the RRC signaling from the MN, S103 may be performed.

In S103, the UE determines whether the received RRC signaling is an RRC signaling of a preset type.

In some embodiments, the RRC signaling of the preset type may be an RRC signaling for PCell change, an RRC signaling for PSCell change, a release signaling for PSCell, or a Release Secondary Cell Group (Release SCG) signaling. Based on the received RRC signaling being any of the above RRC signalings, the UE may perform S104.

Based on the received RRC signaling being not an RRC signaling of the preset type, the received RRC signaling may be processed according to an existing operation process, and the PSCell change is continued.

For example, the received RRC signaling is an RRC signaling for modifying a radio parameter at the current MN side, which is not an RRC signaling of the above-mentioned preset type, and thus the UE may continue to perform the PSCell change.

In S104, the UE terminates the PSCell change.

In some embodiments, during the process of the UE performing the PSCell change, based on receiving the RRC signaling for PCell change, the UE may terminate performing the PSCell change, that is, stop accessing the candidate SN. During the process of the UE performing the PSCell change, based on receiving the RRC signaling for PSCell change, or receiving the release signaling for PSCell, the UE may also terminate the PSCell change, that is, stop accessing the candidate SN.

In some embodiments, after receiving the RRC signaling for PCell change, the UE may acquire content in the RRC signaling for PCell change. Based on detecting that the RRC signaling for PCell change does not include SCG information, the UE may delete saved SCG information corresponding to the source SN and SCG information corresponding to the candidate SN.

In some embodiments, based on detecting that the RRC signaling for PCell change includes new SCG information, the UE may access a target SN corresponding to the new SCG information based on the new SCG information.

Based on the target SN adopting a delta signaling mode, the UE may generate target configuration information based on SCG information corresponding to a source SN and the new SCG information, and then access the target SN based on the target configuration information.

In some embodiments, based on detecting that the RRC signaling for PCell change includes information of a source SN, the UE may terminate the access to the candidate SN, and perform a random access procedure to access the source SN. After successful random access, the UE can receive physical layer control signaling and data from the source SN. At this time, although the UE terminates the access to the candidate SN, it can save the SCG information corresponding to the candidate SN. As the UE may need to perform a PSCell conditional change again to meet mobility requirements, saving the SCG information corresponding to candidate SNs may effectively save air interface signaling overhead if a network reconfigures parameters of the candidate PSCells.

In some embodiments, during performing the PSCell change, the UE may also perform Primary Cell conditional change (PCell conditional handover or PCell conditional change). That is, in the process of performing the PSCell change, once detecting that a candidate PCell meets the conditional handover trigger condition, the UE starts to perform the PCell handover, and the candidate PCell is not configured with SCG or configured with SCG relevant to other PSCells. When the above scenario occurs, the UE may terminate the current PSCell change.

In some embodiments, during performing the PSCell change, if any one of following situations occurs, the UE may terminate the PSCell change, retain the SCG information corresponding to the source SN, and delete the SCG information corresponding to the candidate SN. The situations may include: detection of a radio link failure of a PCell, failure of integrity protection (detection of an integrity verification failure), receiving an RRC signaling from the MN but failing to comply with configuration parameters therein (such as an RRC reconfiguration failure), or trigger of RRC connection reestablishment.

From above, based on detecting an abnormal connection with the MN, the PSCell change is terminated, the SCG information corresponding to the source SN is retained, and the SCG information corresponding to the candidate SN is deleted. In this case, the UE needs to resume the RRC connection preferentially, while terminating the PSCell change may accelerate the RRC connection resume, which may further ensure robustness of a communication link of the UE.

With the cell conditional change method provided in the embodiments of the present disclosure, during a PSCell change, based on an RRC signaling received from an MN having a preset type, the PSCell change being executed is terminated, so that a UE may correctly handle the PSCell change and link management at the MN, which may avoid a scenario in which the UE cannot be controlled, and improve stability of a radio link.

In some embodiments, the corresponding PSCell is indicated in the RRC signaling for PSCell change. In response to receiving the RRC signaling for PSCell change from the MN, the UE may access a PSCell indicated by the RRC signaling for PSCell change.

In some embodiments, based on receiving a release signaling for PSCell or a release SCG signaling from the MN, the UE may delete SCG information corresponding to a source SN and SCG information corresponding to the candidate SN.

In some embodiments, following determining that the candidate PSCell meets the PSCell change trigger condition, the UE may transmit PSCell change information to the MN, wherein the candidate PSCell that meets the PSCell change trigger condition or a target PSCell the UE has selected is indicated in the PSCell change information.

In some embodiments, the PSCell change information may carry identity information corresponding to the candidate PSCell that meets the change trigger condition. Based on the received PSCell change information, the MN can obtain the identity information therefrom, and then learn the candidate PSCell that meets the change triggering condition.

It could be understood that, in practice, the PSCell change information may further carry other information that can indicate the candidate PSCell that meets the change trigger condition, which is not limited to the above-mentioned identity information.

Figure 3:
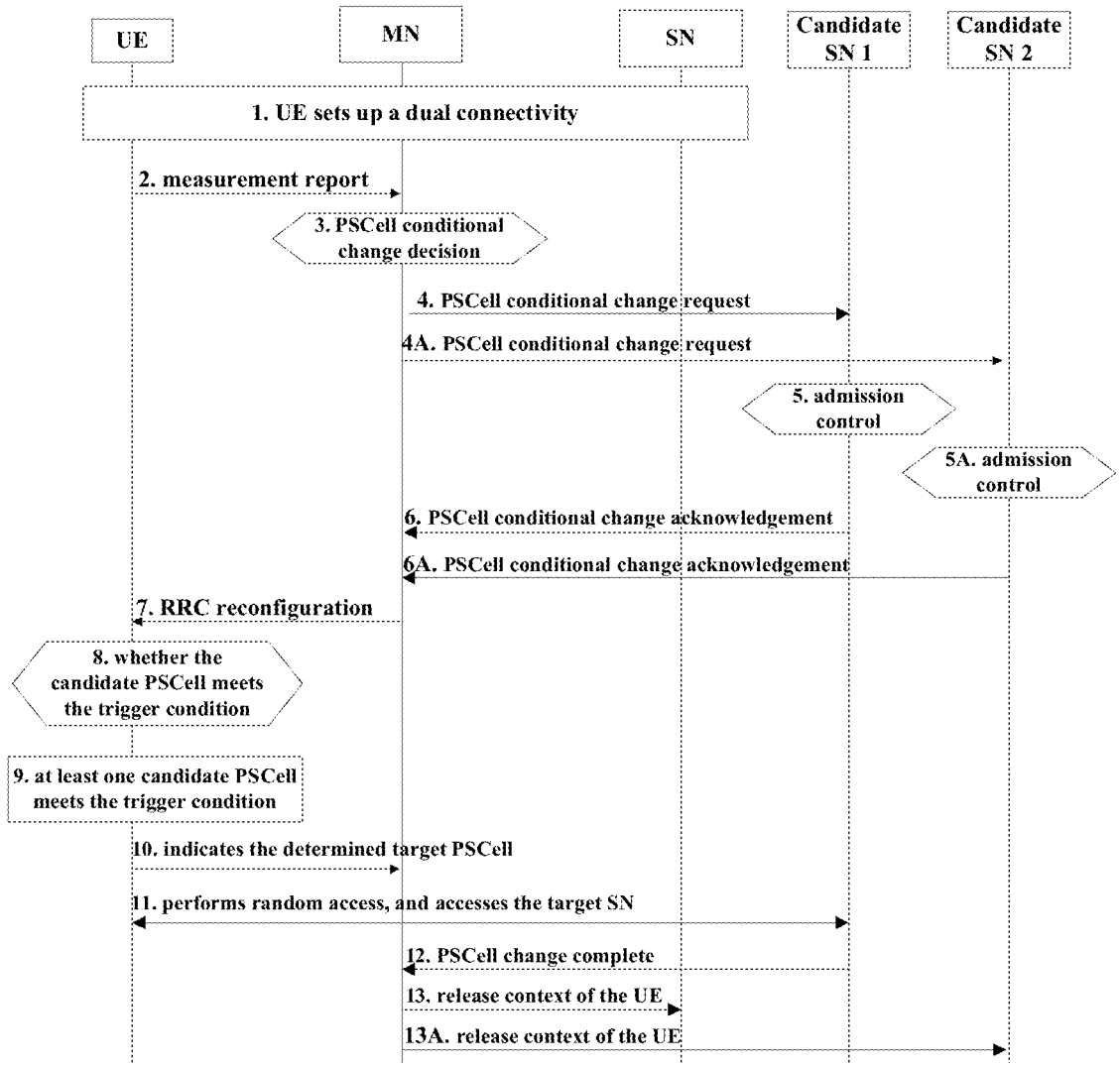
FIG. 3 is a flow chart of a PSCell conditional change according to an embodiment.

FIG. 3 is a flow chart of a PSCell conditional change according to an embodiment. Specific description is provided with detailed steps below.

In step 1, a UE sets up a dual connectivity.

In practice, there are different types of dual connectivity, such as LTE dual connectivity, dual connectivity of LTE and NR, or NR dual connectivity. The dual connectivity of LTE and NR may include EN-DC (an LTE base station serves as UE's MN, and an NR base station serves as UE's SN), NE-DC (an NR base station serves as UE's MN, an LTE base station serves as UE's SN), and NGEN-DC (an LTE base station connected to a 5G core network serves as UE's MN, and an NR base station serves as UE's SN). A process for setting up a dual connectivity is well known in the art, and is not described in detail here. Reference may be made to the 3GPP TS37.340 standard.

In step 2, the UE performs measurement based on measurement configuration, and reports a measurement report to a network based on a reporting condition being met.

In some embodiments, the UE may perform measurement based on a measurement task configured by an MN, and then report the measurement report to the MN based on there being an adjacent cell or a serving cell that meets the reporting condition, where the report carries an identity and signal quality of the adjacent cell and/or the serving cell that meets the reporting condition. That is, the report carries the identity and signal quality of the adjacent cell that meets the reporting condition, or the identity and signal quality of the serving cell that meets the reporting condition, or the identity and signal quality of the adjacent cell that meets the reporting condition and the identity and signal quality of the serving cell that meets the reporting condition.

In step 3, the MN determines to perform the PSCell conditional change based on the measurement report.

In steps 4 and 4A, the MN selects one or more candidate PSCells, and transmits a PSCell conditional change request to a base station to which the one or more candidate PSCells belong, i.e., to a candidate SN. The request includes radio parameters configured by the MN for the UE, in particular, including SN configuration restriction information (ConfigRestrictInfoSCG) set by the MN, as well as UE capability information and radio parameters (sourceConfigSCG) configured by a source SN for the UE. The request further includes a trigger condition or an execution condition for PSCell change and an identity of the candidate PSCell. The UE may determine whether the candidate PSCell meets the trigger condition, and perform the PSCell change or SN change based on the trigger condition being met. The trigger condition may be signal quality of the candidate PSCell being higher than signal quality of the source PSCell by a preset offset.

It should be noted that the PSCell conditional change request may use other names, such as SN conditional change request. A UE in dual connectivity may configure carrier aggregation on the SN, thus the PSCell conditional change request is not limited to a change of PSCell, but can also include a change of other secondary cells. That is, the candidate SN may configure merely parameters of the candidate PSCell for the UE, or parameters of the candidate PSCell and parameters of one or more secondary cells for the UE.

For the selection of multiple candidate PSCells, the MN may transmit PSCell conditional change requests to multiple candidate SNs simultaneously or in sequence.

In steps 5 and 5A, the candidate SN 1 and the candidate SN 2 perform admission control based on a cell load, and receive the change requests when resources allow.

In steps 6 and 6A, in response to receiving the change requests, the candidate SN 1 and the candidate SN 2 allocate necessary radio resources, such as random access resources, for the UE, and feed back to the MN a PSCell conditional change acknowledgement which includes the radio resources configured for the UE, i.e., SCG config.

In step 7, the MN transmits a signaling for PSCell conditional change to the UE. The MN may transmit multiple PSCcell conditional change information at one time via an RRC reconfiguration signaling, or use multiple RRC reconfiguration signalings to transmit multiple PSCcell conditional change information in sequence. The PSCell conditional change information includes an identity of a candidate PSCell, a trigger condition for PSCell change, and radio resources configured for the UE by the candidate SN. Different candidate PSCells may have different or a same trigger condition for PSCell change.

In step 8, the UE receives information of the PSCell conditional change, and determines whether the candidate PSCell meets the trigger condition.

In step 9, the UE finds that at least one candidate PSCell meets the trigger condition. If there are multiple candidate PSCells that meet the trigger condition, the UE may select the candidate PSCell with highest signal quality as the target PSCell for the change, or randomly select a candidate PSCell as the target PSCell for the change.

In step 10, the UE indicates to the MN the determined target PSCell, i.e., the target PSCell that the UE will access. The UE may indicate the determined target PSCell to the MN via RRC signaling, for example, indicating an identity of the determined target PSCell. In response to receiving the indication information, the MN may forward data of a data radio bearer set up by the UE to the target SN in advance, so that the UE can immediately receive downlink data from the target SN after accessing the target SN.

In step 11, the UE performs random access through the radio resources configured for the UE by the determined target SN, and accesses the target SN.

Steps 10 and 11 may be performed in parallel. Step 10 is optional.

In step 12, based on successfully accessing the target SN, the target SN transmits a PSCell change complete message to the MN.

In steps 13 and 13A, the MN notifies a source SN and other candidate SNs to release context of the UE.

In the embodiments of the present disclosure, steps 8 and 9 in FIG. 3 substantially correspond to S101 in FIG. 1, i.e., determining whether there is a PSCell that meets the trigger condition. When there is a PSCell that meets the trigger condition, subsequent steps 10 to 13 and 13A may be performed.

Figure 2:
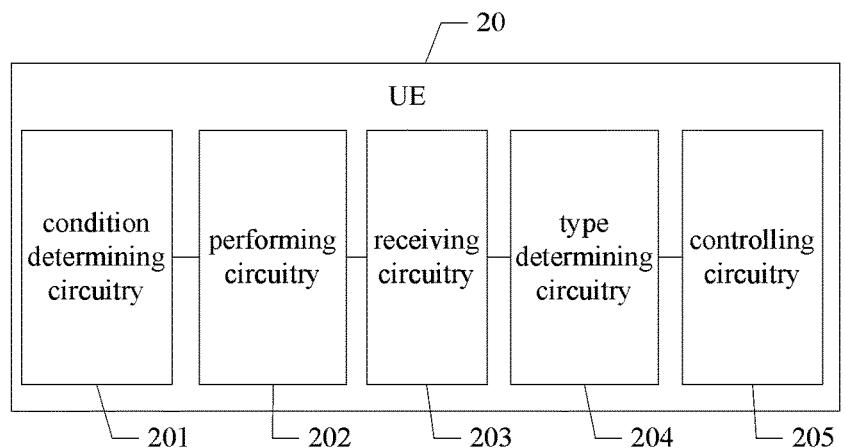
FIG. 2 is a block diagram of a UE according to an embodiment.

Referring to FIG. 2, FIG. 2 is a block diagram of a UE 20 according to an embodiment. The UE 20 includes a condition determining circuitry 201, a performing circuitry 202, a receiving circuitry 203, a type determining circuitry 204 and a controlling circuitry 205.

The condition determining circuitry 201 is configured to determine whether a candidate PSCell meets a PSCell change trigger condition. The performing circuitry 202 is configured to: based on the candidate PSCell meeting the PSCell change trigger condition, perform a PSCell change. The receiving circuitry 203 is configured to: during the PSCell change, receive an RRC signaling from an MN. The type determining circuitry 204 is configured to: determine whether the RRC signaling is an RRC signaling of a preset type, wherein the RRC signaling of the preset type includes an RRC signaling for PCell change, an RRC signaling for PSCell change, or a release signaling for PSCell. The controlling circuitry 205 is configured to: based on the RRC signaling being an RRC signaling of the preset type, terminate the PSCell change.

In some embodiments, the controlling circuitry 205 is further configured to: based on detecting that the RRC signaling for PCell change does not include SCG information, delete SCG information corresponding to a source SN and SCG information corresponding to the candidate SN.

In some embodiments, the controlling circuitry 205 is further configured to: based on detecting that the RRC signaling for PCell change includes new SCG information, access a target SN corresponding to the new SCG information based on the new SCG information.

In some embodiments, the controlling circuitry 205 is configured to: based on the target SN adopting a delta signaling mode, generate target configuration information based on SCG information corresponding to a source SN and the new SCG information; and access the target SN based on the target configuration information.

In some embodiments, the controlling circuitry 205 is further configured to: based on detecting that the RRC signaling for PCell change includes source SN information, terminate accessing the candidate SN.

In some embodiments, the controlling circuitry 205 is further configured to: based on detecting that the RRC signaling for PCell change includes the source SN information, save SCG information corresponding to the candidate SN.

In some embodiments, the UE 20 further includes a PCell handover circuitry (not shown in FIG. 2) configured to: during the PSCell change, based on detecting that a candidate PCell meets a conditional handover trigger condition, perform a PCell handover, and terminate the PSCell change.

In some embodiments, the controlling circuitry 205 is further configured to: based on the type determining circuitry 204 determining that the received RRC signaling is the RRC signaling for PSCell change, access a PSCell indicated by the RRC signaling for PSCell change.

In some embodiments, the controlling circuitry 205 is further configured to: based on the type determining circuitry 204 determining that the received RRC signaling is the release signaling for PSCell, delete SCG information corresponding to a source SN and SCG information corresponding to the candidate SN.

In some embodiments, the UE 20 further includes a transmitting circuitry (not shown in FIG. 2) configured to: based on the condition determining circuitry 201 determining that the candidate PSCell meets the PSCell change trigger condition, transmit PSCell change information to the MN, wherein the candidate PSCell or a target PSCell that meets the PSCell change trigger condition is indicated in the PSCell change information.

In some embodiments, the UE 20 further includes a terminating circuitry (not shown in FIG. 2) configured to: during the PSCell change, based on an abnormal connection with the MN being detected, terminate the PSCell change, wherein the abnormal connection with the MN includes at least one of following scenarios: detection of a radio link failure of a PCell, failure of integrity protection, receiving an RRC signaling from the MN but failing to comply with configuration parameters therein, or trigger of RRC connection reestablishment.

In some embodiments, the UE 20 further includes a saving circuitry (not shown in FIG. 2) configured to: retain SCG information corresponding to a source SN, and delete SCG information corresponding to the candidate SN.

In an embodiment of the present disclosure, a non-volatile or non-transitory computer-readable storage medium having computer instructions stored therein is provided, wherein when the computer instructions are executed by a processor, any one of the above methods is performed.

In an embodiment of the present disclosure, a UE including a memory and a processor is provided, wherein the memory has computer instructions stored therein, and when the processor executes the computer instructions, any one of the above methods is performed.

Those skilled in the art could understand that all or part of the steps of the various methods in the above embodiments can be completed by a program instructing relevant hardware, and the program can be stored in a computer-readable storage medium which may include a ROM, a RAM, a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A cell conditional change method, comprising:
    based on a candidate Primary Secondary Cell (PSCell) meeting a PSCell change trigger condition, performing a PSCell change, wherein the candidate PSCell corresponds to a candidate Secondary Node (SN);
    during the PSCell change, determining whether a preset condition for terminating the PSCell change is met, wherein the preset condition comprises any of the following: a Radio Resource Control (RRC) signaling received from a Master Node (MN) being an RRC signaling of a preset type, wherein the RRC signaling of the preset type comprises an RRC signaling for Primary Cell (PCell) change, an RRC signaling for PSCell change, or a release signaling for PSCell; or an abnormal connection with the MN being detected, wherein the abnormal connection with the MN comprises at least one of following scenarios: detection of a radio link failure of a PCell, failure of integrity protection, receiving an RRC signaling from the MN but failing to comply with configuration parameters therein, or trigger of RRC connection reestablishment; and
    based on the preset condition for terminating the PSCell change being met, terminating the PSCell change;
    wherein following receiving the RRC signaling for PCell change, the method further comprises:
        based on detecting that the RRC signaling for PCell change does not comprise Secondary Cell Group (SCG) information, deleting SCG information corresponding to a source SN and SCG information corresponding to the candidate SN.

2. The method according to claim 1, wherein following receiving the RRC signaling for PCell change, the method further comprises:
    based on detecting that the RRC signaling for PCell change comprises new SCG information, accessing a target SN corresponding to the new SCG information based on the new SCG information.

3. The method according to claim 2, wherein said accessing a target SN corresponding to the new SCG information based on the new SCG information comprises:
    based on the target SN adopting a delta signaling mode, generating target configuration information based on SCG information corresponding to a source SN and the new SCG information; and
    accessing the target SN based on the target configuration information.

4. The method according to claim 1, wherein following receiving the RRC signaling for PCell change, the method further comprises:
    based on detecting that the RRC signaling for PCell change comprises source SN information, accessing a source SN by a random access procedure.

5. The method according to claim 4, wherein following detecting that the RRC signaling for PCell change comprises the source SN information, the method further comprises:
    saving SCG information corresponding to the candidate SN.

6. The method according to claim 1, further comprising:
    during the PSCell change, based on detecting that a candidate PCell meets a conditional handover trigger condition, performing a PCell handover, and terminating the PSCell change.

7. The method according to claim 1, wherein following receiving the RRC signaling for PSCell change from the MN, the method further comprises:
    accessing a PSCell indicated by the RRC signaling for PSCell change.

8. The method according to claim 1, wherein following receiving the release signaling for PSCell from the MN, the method further comprises:
    deleting SCG information corresponding to a source SN and SCG information corresponding to the candidate SN.

9. The method according to claim 1, wherein following determining that the candidate PSCell meets the PSCell change trigger condition, the method further comprises:
    transmitting PSCell change information to the MN, wherein the candidate PSCell or a target PSCell that meets the PSCell change trigger condition is indicated in the PSCell change information.

10. The method according to claim 1, wherein following terminating the PSCell change, the method further comprises:
    retaining SCG information corresponding to a source SN, and deleting SCG information corresponding to the candidate SN.

* * * * *